US011011742B2

United States Patent
Sachdev et al.

(10) Patent No.: US 11,011,742 B2
(45) Date of Patent: May 18, 2021

(54) SILICON EMBEDDED COPPER ANODES AND BATTERY CELLS INCORPORATING THE SAME

(71) Applicant: GM GLOBAL TECHNOLOGY OPERATIONS LLC, Detroit, MI (US)

(72) Inventors: Anil K. Sachdev, Rochester Hills, MI (US); Andrew C. Bobel, Troy, MI (US); James R. Salvador, Royal Oak, MI (US); Mark W. Verbrugge, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 100 days.

(21) Appl. No.: 16/435,760

(22) Filed: Jun. 10, 2019

(65) Prior Publication Data

US 2020/0388824 A1    Dec. 10, 2020

(51) Int. Cl.
| | |
|---|---|
| *H01M 4/134* | (2010.01) |
| *H01M 10/0525* | (2010.01) |
| *H01M 4/38* | (2006.01) |
| *H01M 4/36* | (2006.01) |
| *H01M 4/62* | (2006.01) |
| *H01M 4/72* | (2006.01) |

(Continued)

(52) U.S. Cl.
CPC ........... *H01M 4/134* (2013.01); *H01M 4/364* (2013.01); *H01M 4/386* (2013.01); *H01M 4/626* (2013.01); *H01M 4/662* (2013.01); *H01M 4/74* (2013.01); *H01M 10/0525* (2013.01); *H01M 2004/027* (2013.01); *H01M 2220/20* (2013.01)

(58) Field of Classification Search
CPC ...... H01M 4/134; H01M 4/364; H01M 4/386; H01M 10/0525; H01M 2004/027; H01M 2220/20; H01M 4/626; H01M 4/661; H01M 4/662; H01M 4/74; H01M 2004/025
See application file for complete search history.

(56) References Cited

U.S. PATENT DOCUMENTS 7,858,232 B2 *  12/2010  Bito ..................... H01M 4/134
                                                    429/218.1
8,815,442 B2 *   8/2014  Vidal .................... H01M 4/669
                                                    429/209
(Continued)

FOREIGN PATENT DOCUMENTS

JP          2012038699 A  *  2/2012

OTHER PUBLICATIONS

EPO website (www.espacenet.com) machine translation of the detailed description of JP 2012-038699. (Year: 2012).*

*Primary Examiner* — Gregg Cantelmo
(74) *Attorney, Agent, or Firm* — Quinn IP Law (57) ABSTRACT

Anodes, and battery cells utilizing the same, include silicon particles embedded within a copper matrix, wherein the anode includes 40 at. % to 75 at. % silicon. The anode can include about 21 at. % to about 67 at. % silicon particles. The copper matrix can include pure copper and/or one or more copper-silicon intermetallic phases. The copper matrix can further include one or more of nickel, gold, silver, beryllium, and zinc. The silicon particles embedded in the copper matrix can have an average particle diameter less than 10 μm. The non-surfacial silicon particles embedded in the copper matrix can be at least 99 at. % pure. The anode can be a woven mesh of ribbons or a planar sheet.

18 Claims, 3 Drawing Sheets

(51) Int. Cl.
  *H01M 4/66* (2006.01)
  *H01M 4/02* (2006.01)
  *H01M 4/74* (2006.01)

(56) References Cited

U.S. PATENT DOCUMENTS

| | | | | |
|---|---|---|---|---|
| 2008/0124631 A1* | 5/2008 | Fukui | ............... | H01M 4/134 |
| | | | | 429/217 |
| 2008/0233479 A1* | 9/2008 | Sung | ............... | H01M 4/38 |
| | | | | 429/220 |
| 2011/0223484 A1* | 9/2011 | Korgel | ............... | B82Y 30/00 |
| | | | | 429/231.5 |
| 2013/0344363 A1* | 12/2013 | Upadhyaya | ............... | H01M 4/133 |
| | | | | 429/94 |

* cited by examiner

SILICON EMBEDDED COPPER ANODES AND BATTERY CELLS INCORPORATING THE SAME

INTRODUCTION

Lithium ion batteries describe a class of rechargeable batteries in which lithium ions move between a negative electrode (i.e., anode) and a positive electrode (i.e., cathode). Liquid, solid, and polymer electrolytes can facilitate the movement of lithium ions between the anode and cathode. Lithium-ion batteries are growing in popularity for defense, automotive, and aerospace applications due to their high energy density and ability to undergo successive charge and discharge cycles.

SUMMARY

Provided are anodes which can include silicon particles embedded within a copper matrix, wherein the anode includes 40 at. % to 75 at. % silicon. The anode can include about 21 at. % to about 67 at. % silicon particles. The copper matrix can include pure copper and/or one or more copper-silicon intermetallic phases. The copper matrix can include copper and one or more of nickel, gold, silver, beryllium, and zinc. A non-silicon fraction of the copper matrix can include copper and up to about 50 at. % nickel. The copper matrix can include one or more copper phases, one or more nickel phases, one or more copper-nickel alloy phases, one or more copper-silicon intermetallic phases, one or more nickel-silicon intermetallic phases, and/or one or more copper-nickel-silicon intermetallic phases. A non-silicon fraction of the copper matrix can include copper and up to about 50 at. % zinc. The copper matrix can include one or more copper phases, one or more zinc phases, one or more copper-zinc alloy phases, one or more copper-silicon intermetallic phases, one or more zinc-silicon intermetallic phases, and/or one or more copper-zinc-silicon intermetallic phases. The silicon particles embedded in the copper matrix can have an average particle diameter less than 10 μm. The non-surfacial silicon particles embedded in the copper matrix can be at least 99 at. % pure. The anode can be a woven mesh of ribbons. The anode can be a planar sheet.

Provided are battery cells, which can include an anode, a cathode, and an electrolyte in contact with the anode and the cathode. The anode can include silicon particles embedded within a copper matrix, and the anode can be 40 at. % to 75 at. % silicon and about 21 at. % to about 67 at. % silicon particles. The copper matrix can be pure copper and/or one or more copper-silicon intermetallic phases. The copper matrix can be copper and one or more of nickel, gold, silver, beryllium, and zinc. A non-silicon fraction of the copper matrix can include copper and up to about 50 at. % nickel, and the copper matrix includes one or more copper phases, one or more nickel phases, one or more copper-nickel alloy phases, one or more copper-silicon intermetallic phases, one or more nickel-silicon intermetallic phases, and/or one or more copper-nickel-silicon intermetallic phases. A non-silicon fraction of the copper matrix can include copper and up to about 50 at. % zinc, and the copper matrix includes one or more copper phases, one or more zinc phases, one or more copper-zinc alloy phases, one or more copper-silicon intermetallic phases, one or more zinc-silicon intermetallic phases, and/or one or more copper-zinc-silicon intermetallic phases. The silicon particles embedded in the copper matrix can have an average particle diameter less than 10 μm. The anode be only silicon particles embedded within the copper matrix.

Provided are anodes which only include silicon particles embedded in a copper matrix. The anode can include 60 at. % to 70 at. % silicon and about 47 at. % to about 61 at. % silicon particles, and the silicon particles can have an average particle diameter less than 10 μm.

Other objects, advantages and novel features of the exemplary embodiments will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Provided herein are anodes and battery cells utilizing the same which incorporate current collectors and lithium host materials into a single composite material. The anodes described herein offer reduced weight, increased capacity, and reduced manufacturing steps relative to traditional anodes.

Figure 1:
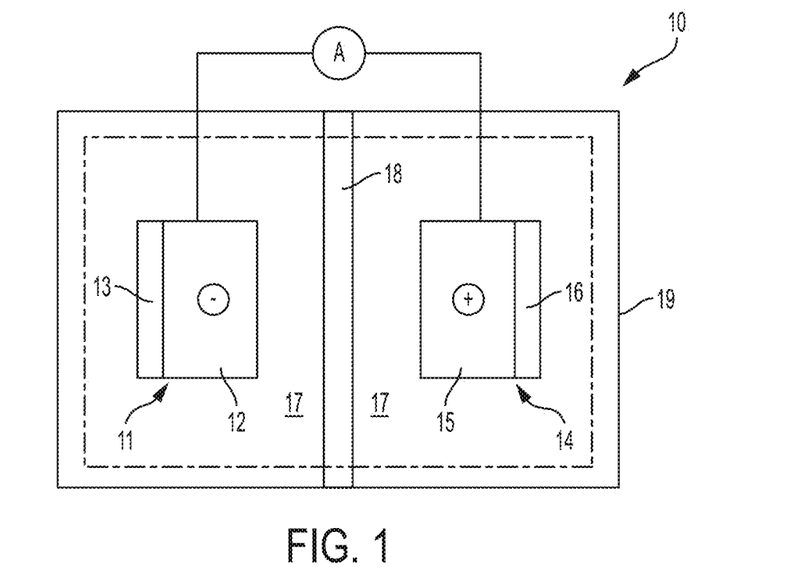
FIG. 1 illustrates a lithium battery cell, according to one or more embodiments.

FIG. 1 illustrates a lithium battery cell 10 comprising a negative electrode (i.e., the anode) 11, a positive electrode (i.e., the cathode) 14, an electrolyte 17 operatively disposed between the Anode 11 and the cathode 14, and a separator 18. Anode 11, cathode 14, and electrolyte 17 can be encapsulated in container 19, which can be a hard (e.g., metallic) case or soft (e.g., polymer) pouch, for example. The Anode 11 and cathode 14 are situated on opposite sides of separator 18 which can comprise a microporous polymer or other suitable material capable of conducting lithium ions and optionally electrolyte (i.e., liquid electrolyte). Electrolyte 17 is a liquid electrolyte comprising one or more lithium salts dissolved in a non-aqueous solvent. Anode 11 generally includes a current collector 12 and a lithium intercalation host material 13 applied thereto. Cathode 14 generally includes a current collector 15 and a transition metal oxide-based, lithium-based, or chalcogen-based active material 16 applied thereto. For example, the battery cell 10 can comprise a chalcogen active material 16 or a lithium metal oxide active material 16, among many others, as will be described below. Active material 16 can store lithium ions at a higher electric potential than intercalation host material 13, for example. The current collectors 12 and 15 associated with the two electrodes are connected by an interruptible external circuit that allows an electric current to pass between the electrodes to electrically balance the related migration of lithium ions. Although FIG. 1 illustrates host material 13 and active material 16 schematically for the sake of clarity, host material 13 and active material 16 can comprise an exclusive interface between the anode 11 and cathode 14, respectively, and electrolyte 17.

Figure 2:
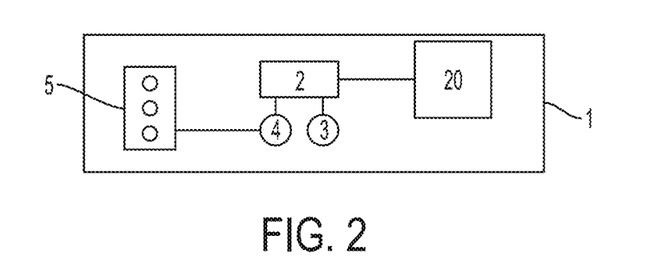
FIG. 2 illustrates a schematic diagram of a hybrid-electric vehicle, according to one or more embodiments.

Battery cell 10 can be used in any number of applications. For example, FIG. 2 illustrates a schematic diagram of a hybrid-electric vehicle 1 including a battery pack 20 and related components. A battery pack such as the battery pack 20 can include a plurality of battery cells 10. A plurality of battery cells 10 can be connected in parallel to form a group, and a plurality of groups can be connected in series, for example. One of skill in the art will understand that any number of battery cell connection configurations are practicable utilizing the battery cell architectures herein disclosed, and will further recognize that vehicular applications are not limited to the vehicle architecture as described. Battery pack 20 can provide energy to a traction inverter 2 which converts the direct current (DC) battery voltage to a three-phase alternating current (AC) signal which is used by a drive motor 3 to propel the vehicle 1. An engine 5 can be used to drive a generator 4, which in turn can provide energy to recharge the battery pack 20 via the inverter 2. External (e.g., grid) power can also be used to recharge the battery pack 20 via additional circuitry (not shown). Engine 5 can comprise a gasoline or diesel engine, for example.

Battery cell 10 generally operates by reversibly passing lithium ions between Anode 11 and cathode 14. Lithium ions move from cathode 14 to Anode 11 while charging, and move from Anode 11 to cathode 14 while discharging. At the beginning of a discharge, Anode 11 contains a high concentration of intercalated/alloyed lithium ions while cathode 14 is relatively depleted, and establishing a closed external circuit between Anode 11 and cathode 14 under such circumstances causes intercalated/alloyed lithium ions to be extracted from Anode 11. The extracted lithium atoms are split into lithium ions and electrons as they leave an intercalation/alloying host at an electrode-electrolyte interface. The lithium ions are carried through the micropores of separator 18 from Anode 11 to cathode 14 by the ionically conductive electrolyte 17 while, at the same time, the electrons are transmitted through the external circuit from Anode 11 to cathode 14 to balance the overall electrochemical cell. This flow of electrons through the external circuit can be harnessed and fed to a load device until the level of intercalated/alloyed lithium in the negative electrode falls below a workable level or the need for power ceases.

Battery cell 10 may be recharged after a partial or full discharge of its available capacity. To charge or re-power the lithium ion battery cell, an external power source (not shown) is connected to the positive and the negative electrodes to drive the reverse of battery discharge electrochemical reactions. That is, during charging, the external power source extracts the lithium ions present in cathode 14 to produce lithium ions and electrons. The lithium ions are carried back through the separator by the electrolyte solution, and the electrons are driven back through the external circuit, both towards Anode 11. The lithium ions and electrons are ultimately reunited at the negative electrode, thus replenishing it with intercalated/alloyed lithium for future battery cell discharge.

Lithium ion battery cell 10, or a battery module or pack comprising a plurality of battery cells 10 connected in series and/or in parallel, can be utilized to reversibly supply power and energy to an associated load device. Lithium ion batteries may also be used in various consumer electronic devices (e.g., laptop computers, cameras, and cellular/smart phones), military electronics (e.g., radios, mine detectors, and thermal weapons), aircrafts, and satellites, among others. Lithium ion batteries, modules, and packs may be incorporated in a vehicle such as a hybrid electric vehicle (HEV), a battery electric vehicle (BEV), a plug-in HEV, or an extended-range electric vehicle (EREV) to generate enough power and energy to operate one or more systems of the vehicle. For instance, the battery cells, modules, and packs may be used in combination with a gasoline or diesel internal combustion engine to propel the vehicle (such as in hybrid electric vehicles), or may be used alone to propel the vehicle (such as in battery powered vehicles).

Returning to FIG. 1, electrolyte 17 conducts lithium ions between anode 11 and cathode 14, for example during charging or discharging the battery cell 10. The electrolyte 17 comprises one or more solvents, and one or more lithium salts dissolved in the one or more solvents. Suitable solvents can include cyclic carbonates (ethylene carbonate, propylene carbonate, butylene carbonate), acyclic carbonates (dimethyl carbonate, diethyl carbonate, ethylmethylcarbonate), aliphatic carboxylic esters (methyl formate, methyl acetate, methyl propionate), γ-lactones (γ-butyrolactone, γ-valerolactone), chain structure ethers (1,3-dimethoxypropane, 1,2-dimethoxyethane (DME), 1-2-diethoxyethane, ethoxymethoxyethane), cyclic ethers (tetrahydrofuran, 2-methyltetrahydrofuran, 1,3-dioxolane), and combinations thereof. A non-limiting list of lithium salts that can be dissolved in the organic solvent(s) to form the non-aqueous liquid electrolyte solution include $LiClO_4$, $LiAlCl_4$, $LiI$, $LiBr$, $LiSCN$, $LiBF_4$, $LiB(C_6H_5)_4$, $LiAsF_6$, $LiCF_3SO_3$, $LiN(CF_3SO_2)_2$, $LiN(FSO_2)_2$, $LiPF_6$, and mixtures thereof.

The microporous polymer separator 18 can comprise, in one embodiment, a polyolefin. The polyolefin can be a homopolymer (derived from a single monomer constituent) or a heteropolymer (derived from more than one monomer constituent), either linear or branched. If a heteropolymer derived from two monomer constituents is employed, the polyolefin can assume any copolymer chain arrangement including those of a block copolymer or a random copolymer. The same holds true if the polyolefin is a heteropolymer derived from more than two monomer constituents. In one embodiment, the polyolefin can be polyethylene (PE), polypropylene (PP), or a blend of PE and PP. The microporous polymer separator 18 may also comprise other polymers in addition to the polyolefin such as, but not limited to, polyethylene terephthalate (PET), polyvinylidene fluoride (PVdF), and or a polyamide (Nylon). Separator 18 can optionally be ceramic-coated with materials including one or more of ceramic type aluminum oxide (e.g., $Al_2O_3$), and lithiated zeolite-type oxides, among others. Lithiated zeolite-type oxides can enhance the safety and cycle life performance of lithium ion batteries, such as battery cell 10. Skilled artisans will undoubtedly know and understand the many available polymers and commercial products from which the microporous polymer separator 18 may be fabricated, as well as the many manufacturing methods that may be employed to produce the microporous polymer separator 18.

Active material 16 can include any lithium-based active material that can sufficiently undergo lithium intercalation and deintercalation while functioning as the positive terminal of battery cell 10. Active material 16 can also include a polymer binder material to structurally hold the lithium-based active material together. The active material 16 can comprise lithium transition metal oxides (e.g., layered lithium transitional metal oxides) or chalcogen materials. Cathode current collector 15 can include aluminum or any other appropriate electrically conductive material known to skilled artisans, and can be formed in a foil or grid shape. Cathode current collector 15 can be treated (e.g., coated) with highly electrically conductive materials, including one or more of conductive carbon black, graphite, carbon nanotubes, carbon nanofiber, graphene, and vapor growth carbon fiber (VGCF), among others. The same highly electrically conductive materials can additionally or alternatively be dispersed within the host material 13.

Lithium transition metal oxides suitable for use as active material 16 can comprise one or more of spinel lithium manganese oxide ($LiMn_2O_4$), lithium cobalt oxide ($LiCoO_2$), a nickel-manganese oxide spinel ($Li(Ni_{0.5}Mn_{1.5})O_2$), a layered nickel-manganese-cobalt oxide (having a general formula of $xLi_2MnO_3 \cdot (1-x)LiMO_2$, where M is composed of any ratio of Ni, Mn and/or Co). A specific example of the layered nickel-manganese oxide spinel is $xLi_2MnO_3 \cdot (1-x)Li(Ni_{1/3}Mn_{1/3}Co_{1/3})O_2$. Other suitable lithium-based active materials include $Li(Ni_{1/3}Mn_{1/3}Co_{1/3})O_2$), $LiNiO_2$, $L_{x+y}Mn_{2-y}O_4$ (LMO, $0<x<1$ and $0<y<0.1$), or a lithium iron polyanion oxide, such as lithium iron phosphate ($LiFePO_4$) or lithium iron fluorophosphate ($Li_2FePO_4F$). Other lithium-based active materials may also be utilized, such as $LiNi_xM_{1-x}O_2$ (M is composed of any ratio of Al, Co, and/or Mg), $LiNi_{1-x}Co_{1-y}Mn_{x+y}O_2$ or $LiMn_{1.5-x}Ni_{0.5-y}M_{x+y}O_4$ (M is composed of any ratio of Al, Ti, Cr, and/or Mg), stabilized lithium manganese oxide spinel ($Li_xMn_{2-y}M_yO_4$, where M is composed of any ratio of Al, Ti, Cr, and/or Mg), lithium nickel cobalt aluminum oxide (e.g., $LiNi_{0.8}Co_{0.15}Al_{0.05}O_2$ or NCA), aluminum stabilized lithium manganese oxide spinel ($Li_xMn_{2-x}Al_yO_4$), lithium vanadium oxide ($LiV_2O_5$), $Li_2MSiO_4$ (M is composed of any ratio of Co, Fe, and/or Mn), and any other high efficiency nickel-manganese-cobalt material (HE-NMC, NMC or $LiNiMnCoO_2$). By "any ratio" it is meant that any element may be present in any amount. So, for example, M could be Al, with or without Co and/or Mg, or any other combination of the listed elements. In another example, anion substitutions may be made in the lattice of any example of the lithium transition metal based active material to stabilize the crystal structure. For example, any O atom may be substituted with an F atom.

Chalcogen-based active material can include one or more sulfur and/or one or more selenium materials, for example. Sulfur materials suitable for use as active material 16 can comprise sulfur carbon composite materials, $S_8$, $Li_2S_8$, $Li_2S_6$, $Li_2S_4$, $Li_2S_2$, $Li_2S$, $SnS_2$, and combinations thereof. Another example of sulfur-based active material includes a sulfur-carbon composite. Selenium materials suitable for use as active material 16 can comprise elemental selenium, $Li_2Se$, selenium sulfide alloys, $SeS_2$, $SnSe_xS_y$ (e.g., $SnSe_{0.5}S_{0.5}$) and combinations thereof. The chalcogen-based active material of the positive electrode 22' may be intermingled with the polymer binder and the conductive filler. Suitable binders include polyvinylidene fluoride (PVDF), polyethylene oxide (PEO), an ethylene propylene diene monomer (EPDM) rubber, carboxymethyl cellulose (CMC)), styrene-butadiene rubber (SBR), styrene-butadiene rubber carboxymethyl cellulose (SBR-CMC), polyacrylic acid (PAA), cross-linked polyacrylic acid-polyethylenimine, polyimide, or any other suitable binder material known to skilled artisans. Other suitable binders include polyvinyl alcohol (PVA), sodium alginate, or other water-soluble binders. The polymer binder structurally holds the chalcogen-based active material and the conductive filler together. An example of the conductive filler is a high surface area carbon, such as acetylene black or activated carbon. The conductive filler ensures electron conduction between the positive-side current collector 26 and the chalcogen-based active material. In an example, the positive electrode active material and the polymer binder may be encapsulated with carbon. In an example, the weight ratio of S and/or Se to C in the positive electrode 22' ranges from 1:9 to 9:1.

The anode current collector 12 can include copper, nickel, stainless steel, or any other appropriate electrically conductive material known to skilled artisans. Anode current collector 12 can be treated (e.g., coated) with highly electrically conductive materials, including one or more of conductive carbon black, graphite, carbon nanotubes, carbon nanofiber, graphene, and vapor growth carbon fiber (VGCF), among others, in order to decrease electrical resistance between the current collector 12 and the host material 13. The host material 13 applied to the anode current collector 12 can include any lithium host material that can sufficiently undergo lithium ion intercalation, deintercalation, and alloying, while functioning as the negative terminal of the lithium ion battery 10. Host material 13 can optionally further include a polymer binder material to structurally hold the lithium host material together. For example, in one embodiment, host material 13 can further include a carbonaceous material (e.g., graphite) and/or one or more of binders (e.g., polyvinyldiene fluoride (PVdF), an ethylene propylene diene monomer (EPDM) rubber, carboxymethoxyl cellulose (CMC), and styrene, 1,3-butadiene polymer (SBR)).

Silicon has the highest known theoretical charge capacity for lithium, making it one of the most promising anode host materials 13 for rechargeable lithium-ion batteries. In two general embodiments, a silicon host material 13 can comprise Si particles, or $SiO_x$ particles. $SiO_x$ particles, wherein generally $x \leq 2$, can vary in composition. In some embodiments, for some $SiO_x$ particles, $x \approx 1$. For example, x can be about 0.9 to about 1.1, or about 0.99 to about 1.01. Within a body of $SiO_x$ particles, $SiO_2$ and/or Si domains may further exist. Silicon host material 13 comprising Si particles or $SiO_x$ particles can comprise average particle diameters of about 20 nm to about 20 μm, among other possible sizes.

During the first cycling of a "fresh" anode, silicon-based host materials 13 can exhibit volumetric expansion by a factor of 3 or more. Further, the bulk silicon-based host material 13 (e.g., as applied via a slurry to current collector 12) can exhibit unsuitable electrical resistance with the current collector 12 due to a lack of circumferential contact with the current collector 12. Accordingly, provided herein are anodes and battery cells comprising the same which are a single component incorporating the aspects of both current collectors 12 and host material 13.

Figure 3:
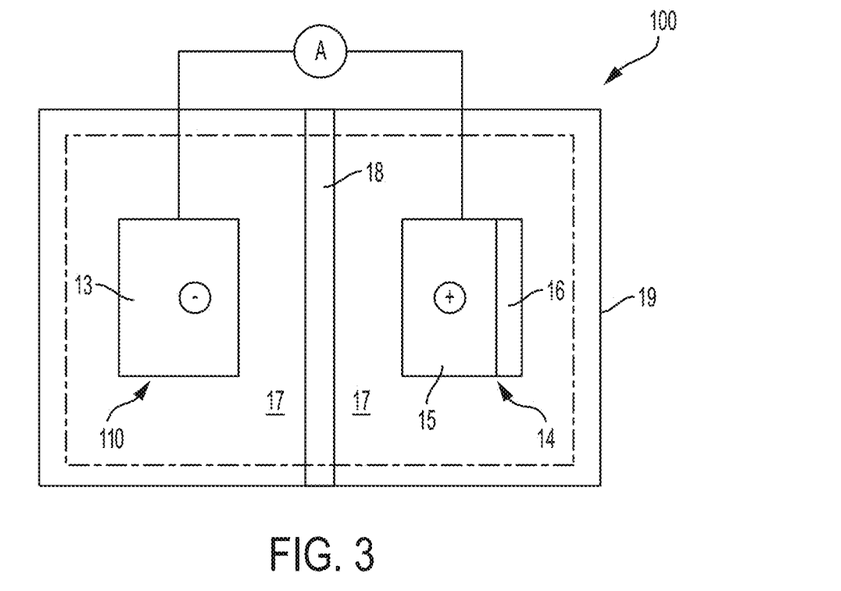
FIG. 3 illustrates a lithium battery cell, according to one or more embodiments.
Figure 4:
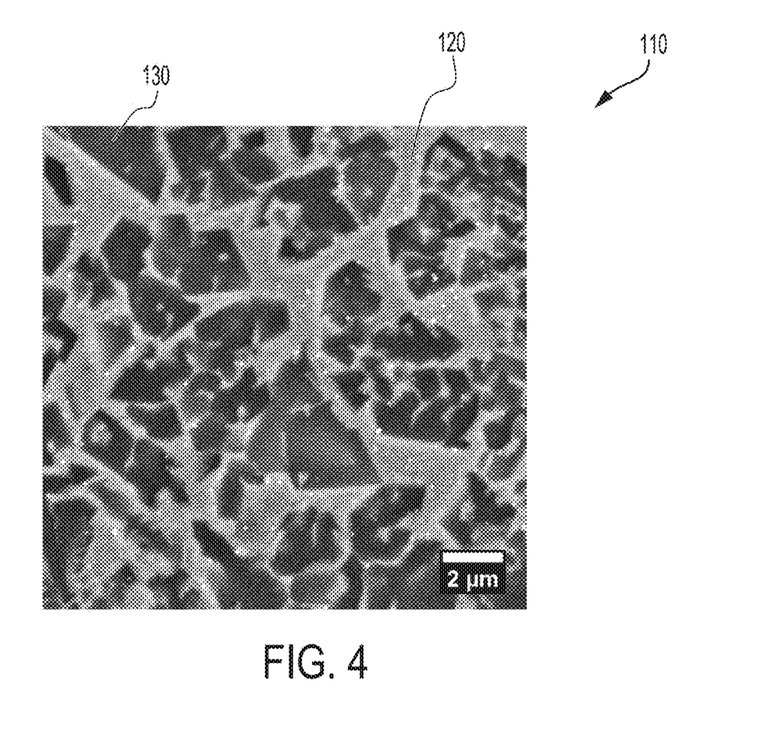
FIG. 4 illustrates a scanning electron microscope image of an anode, according to one or more embodiments.

FIG. 3 illustrates a battery cell 100 analogous to battery cell 10 which includes an anode 110. Anode 110 comprises a single body or body formed of a single generally homogenous material which performs the general function(s) of current collectors 12 and host materials 13 as described above. Anode 110 comprises silicon particles, acting as the silicon host material, embedded within a copper matrix, acting as the current collector. In other embodiments, the anode 110 can comprise silicon particles embedded within a nickel matrix or embedded within a gold matrix. For example, FIG. 4 illustrates a scanning electron microscope image of an example of anode 110 comprising silicon particles 130 embedded in copper matrix 120. The encapsulation of the silicon particles 130 within the copper matrix 120 achieves a reduced electrical resistance between the silicon particles 130 and the copper matrix 120 relative to the silicon host material 13 and current collectors 12 of traditional anode designs due to the direct thermodynamic interface between the embedded silicon particles 130 and the copper matrix 120. Further, the ductility of the copper matrix 120 robustly accommodates expansion of the silicon particle 130 host material. Embedding the silicon particles 130 within the copper matrix 120 also reduces the amount of copper (or other current collector material) required to achieve a desired capacity relative to a traditional anode (e.g., of battery cell 10), and manufacturing steps can be eliminated relative to traditional anodes.

The anode 110 can comprise about 35 at. % to about 80 at. %, about 40 at. % to about 75 at. %, or about 60 at. % to about 70 at. % silicon, wherein the balance of the anode can comprise the copper matrix 120. Silicon can be present within the anode 110 as silicon particles 130 (silicon precipitates as will be described below) and optionally as one or more metal-silicon intermetallic phases within the copper matrix 120. For example, the anode 110 can include about 35 at. % to about 80 at. % silicon, wherein about 14 at. % to about 74 at. % of the anode 110 comprises silicon particles 130 and the balance comprises the copper matrix 120 (i.e., about 21 at. % to about 6 at. % of the anode comprises silicon in a metal-silicon intermetallic phase within the copper matrix 120). In another example, the anode 110 can include about 40 at. % to about 75 at. % silicon, wherein about 21 at. % to about 67 at. % of the anode 110 comprises silicon particles 130 and the balance comprises the copper matrix 120. In another example, the anode 110 can include about 60 at. % to about 70 at. % silicon, wherein about 47 at. % to about 61 at. % of the anode 110 comprises silicon particles 130 and the balance comprises the copper matrix 120. In some embodiments, the anode 110 consists of silicon particles 130 embedded in the copper matrix 120 (i.e., the anode does not comprise any additional host material or conductive coatings).

The silicon particles 130 can have an average particle size of about 0.5 µm to about 200 µm, or about 0.5 µm to about 50 µm. In some embodiments the silicon particles 130 can have an average particle size of less than about 10 µm, or about 1 µm to about 5 µm. Most of the silicon particles 130 will be contained within the bulk of the copper matrix 120 (i.e., non-surfacial silicon particles 130) and a certain remaining amount of silicon particles 130 will be embedded within the copper matrix 120 and partially define a portion of one or more surfaces of the anode 110 (i.e., surfacial silicon particles 130). Depending on processing conditions, battery cycling characteristics, and other factors, the surfacial silicon particles may comprise silicon oxides (e.g., $SiO_x$). In most embodiments, the non-surfacial silicon particles 130 comprise at least 99 at. % pure silicon (i.e., very little silicon oxides).

In general, the copper matrix 120 is generally chemically inert to the lithium ions which migrate in and out of the anode 110 during battery cycling. The copper matrix 120 can be described as a copper-rich matrix comprising elemental copper and/or one or more copper-silicon intermetallic phases. In some embodiments, the copper matrix 120 largely comprises copper-silicon intermetallic phases which exhibit high electrical conductivity but are brittle relative to elemental copper. Copper-silicon intermetallic phases can include eta phase $Cu_3Si$, gamma phase $Cu_{56}Si_{11}$, and epsilon phase $Cu_{15}Si_4$, among others. The copper matrix 120 can comprise at least about 90 at. %, at least about 95 at. %, or at least about 99 at. % copper-silicon intermetallic phases. In some embodiments, the copper-silicon intermetallic phases substantially comprise eta phase $Cu_3Si$ (e.g., greater than 99 at. % eta phase $Cu_3Si$).

The copper matrix 120 can optionally comprise one or more alloying metals ("X"), and such a copper matrix 120 can comprise one or more copper phases, one or more X phases, one or more copper-X alloy phases (with one or more X elements), one or more X-X alloy phases (with two or more different X elements), one or more copper-silicon intermetallic phases, one or more X-silicon intermetallic phases (with one or more X elements), and/or one or more copper-X-silicon intermetallic phases (with one or more X elements). Additional alloying metals X can include one or more of nickel, gold, silver, beryllium, and zinc, in some embodiments. Although the additional alloying elements may reduce electron conduction between the copper matrix 120 and the silicon particles 130, the formation of copper-X alloy phases both reduces the formation of brittle copper-silicon intermetallic phases and thereby increases the amount of silicon particle precipitates within the anode 110. Further, the ductile copper-X alloy phases compensate by adding strength and lending mechanical integrity to the copper matrix 120, particularly during silicon particle 130 expansion (e.g., during initial battery cell 100 lithiation).

In some embodiments, the copper matrix 120 comprises copper, nickel, and silicon, wherein the non-silicon fraction of the copper matrix 120 comprises up to about 50 at. %, up to about 30 at. %, or up to about 10 at. % nickel. In such embodiments, the copper matrix 120 comprises one or more copper phases (e.g., FCC copper), one or more nickel phases (e.g., FCC nickel), one or more copper-nickel alloy phases (e.g., FCC copper-nickel), one or more copper-silicon intermetallic phases (e.g., $Cu_3Si$, $Cu_{5.6}Si_{11}$, and $Cu_{15}Si_4$), one or more nickel-silicon intermetallic phases (e.g., $NiSi$, $Ni_2Si$, $NiSi_2$, $Ni_3Si_2$), and/or one or more ternary copper-nickel-silicon intermetallic phases.

In some embodiments, the copper matrix 120 comprises copper, zinc, and silicon, wherein the non-silicon fraction of the copper matrix 120 comprises up to about 50 at. %, up to about 30 at. %, or up to about 10 at. % zinc. In such embodiments, the copper matrix 120 comprises one or more copper phases (e.g., FCC copper), one or more zinc phases, one or more copper-zinc alloy phases (e.g., FCC Cu—Zn, BCC copper-zinc, $Zn_4Cu$), one or more copper-silicon intermetallic phases (e.g., $Cu_3Si$, $Cu_{56}Si_{11}$, and $Cu_{15}Si_4$), one or more zinc-silicon intermetallic phases, and/or one or more copper-zinc-silicon intermetallic phases (e.g., $Cu_xZi_ySi_z$).

The copper alloy can comprise an alloy of copper and one or more of nickel, gold, silver, beryllium, and zinc. The copper matrix 120 can comprise a copper-nickel alloy, wherein the alloy comprises up to about 50 at. %, up to about 30 at. %, or up to about 10 at. % nickel. The copper matrix 120 can comprise an alloy of copper and one or more of nickel, gold, silver, beryllium, and zinc, wherein the one or more of nickel, gold, silver, beryllium, and zinc collectively comprise up to about 50 at. %, up to about 30 at. %, or up to about 10 at. % of the alloy.

The copper matrix 120 can comprise at most 10 at. %, at most 5 at. %, or at most 2 at. % impurities. Impurities can generally include elements which reduce the electrical conductivity of the copper matrix 120 without providing a countervailing advantageous characteristic such as enhanced strength or malleability. For example, impurities can include one or more of iron, manganese antimony, arsenic, lead, and cobalt.

Figure 5:
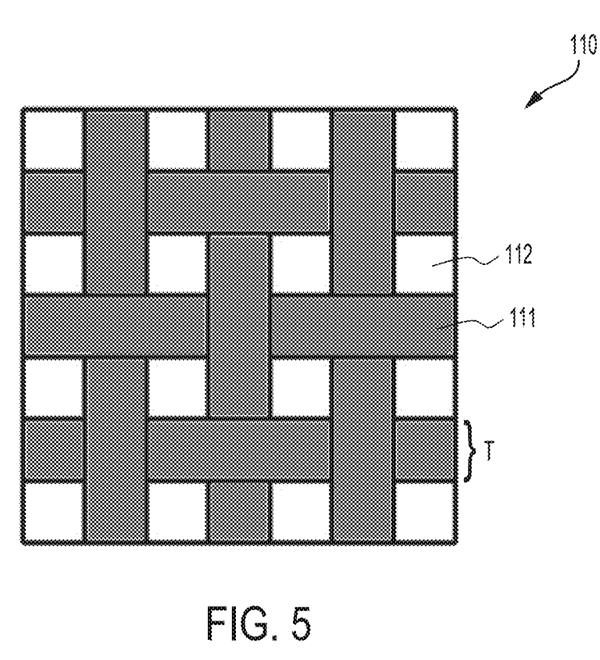
FIG. 5 illustrates an anode formed from a woven mesh, according to one or more embodiments.

The anode 110 can be provided in various geometric forms, some of which may be dependent upon the manufacture of the anode material as will be described below. For example, the anode 110 can comprise a planar sheet or other solid body. The anode 110 can optionally comprise apertures. As illustrated in FIG. 5, in some embodiments the anode 110 can comprise a woven mesh of ribbons 111 (e.g., formed by melt spinning, as described below). The ribbons 111 comprise silicon particles 130 embedded in the copper matrix 120, as described above. The woven mesh can comprise apertures 112 sized based on the thickness T of the ribbons 111, the tightness of the mesh weave, and the desired performance characteristics of the anode 110, for example.

Anodes 110 can achieve higher capacities with reduced material weight relative to conventional anodes (e.g., anode 11). For example, a battery cell 100 utilizing an anode 110 comprising about 70 at. % silicon particles and a thickness of about 20 μm and a cathode 14 comprising a NMC active material 16 can achieve a capacity of up to about 7 mAh/cm$^2$. To achieve the same capacity, a traditional anode would require a copper current collector (e.g., current collector 12 of battery cell 10) with a thickness of 7 μm, whereas anode 110 utilizes an amount of copper equivalent to a copper current collector with a thickness of 4 μm (i.e., a copper weight-savings of about ~43%).

Anodes 110 can be manufactured in a generally one-step process by forming a molten copper-silicon alloy (e.g., using a >97 at. % "pure" copper feedstock) which is supersaturated with silicon, and subsequently cooling/solidifying, and optionally heat treating, the molten alloy such that the silicon forms precipitates within the copper matrix. As discussed above, non-surfacial silicon particles are in total circumferential contact with the copper matrix, as differentiated from the point contact orientation of silicon-based host materials 13 (e.g., applied as a slurry to current collector 12). The process can further comprise consolidation of the produced materials.

The cooling/solidifying step can be a rapid solidification step achieved by melt spinning, atomization, and spray drying, among others. Aspects of the cooling/solidifying step can be tuned to control the shape (e.g., rounding or coarsening) and/or size distribution of the silicon particles 130, and the ductility of the copper matrix 120, for example. In the case of melt spinning, wherein the molten copper-silicon alloy is applied to a rotating copper wheel for solidification, the rotational speed of the copper wheel can dictate the thickness and quench rate of the solidified ribbons.

The consolidation step can be accomplished via traditional methods such as weaving, metal peeling, billet consolidation followed by extrusion and/or rolling, direct roll consolidation of melt spun ribbons, and crushing and sintering, for example. In all instances of the process, the ribbons can be formed with varying thicknesses (e.g., as controlled by a crucible slit size) such that the ribbons may be formed in the desired anode 110 thickness, cut to reduce the thickness T to a desired anode 110 thickness, woven to create an anode 110, or crushed and subsequently to form an anode 110 of a desired size and shape.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An anode comprising silicon particles embedded within a copper matrix, wherein the anode comprises 40 at. % to 75 at. % total silicon,
   wherein the anode comprises about 21 at. % to about 67 at. % silicon present as the embedded silicon particles and the balance of the total silicon in the anode is present as one or more metal-silicon intermetallic phases in the copper matrix,
   wherein the copper matrix comprises copper, silicon, and at least one of gold, silver, beryllium, or zinc, and
   wherein at least one of the one or more metal-silicon intermetallic phases in the copper matrix comprises gold, silver, beryllium, or zinc.

2. The anode of claim 1, wherein the copper matrix comprises elemental copper and one or more copper-silicon intermetallic phases, and wherein the one or more copper-silicon intermetallic phases comprise eta phase $Cu_3Si$, gamma phase $Cu_{56}Si_{11}$, and/or epsilon phase $Cu_{15}Si_4$.

3. The anode of claim 1, wherein the copper matrix further comprises nickel.

4. The anode of claim 3, wherein the copper matrix comprises one or more copper phases, one or more nickel phases, one or more copper-nickel alloy phases, one or more copper-silicon intermetallic phases, one or more nickel-silicon intermetallic phases, and/or one or more copper-nickel-silicon intermetallic phases.

5. The anode of claim 1, wherein a non-silicon fraction of the copper matrix comprises copper and up to about 50 at. % zinc.

6. The anode of claim 5, wherein the copper matrix comprises one or more copper phases, one or more zinc phases, one or more copper-zinc alloy phases, one or more copper-silicon intermetallic phases, one or more zinc-silicon intermetallic phases, and/or one or more copper-zinc-silicon intermetallic phases.

7. The anode of claim 1, wherein the silicon particles embedded in the copper matrix have an average particle diameter less than 10 μm.

8. The anode of claim 1, wherein a major portion of the silicon particles embedded within the copper matrix are non-surfacial silicon particles embedded in a bulk of the copper matrix, and wherein the non-surfacial silicon particles embedded in the bulk of the copper matrix are at least 99 at. % pure silicon.

9. The anode of claim 1, wherein the anode comprises a woven mesh of ribbons.

10. The anode of claim 1, wherein the anode comprises a planar sheet.

11. The anode of claim 1, wherein the copper matrix includes one or more zinc-silicon intermetallic phases, one or more copper-zinc-silicon intermetallic phases, one or more gold-silicon intermetallic phases, one or more copper-gold-silicon intermetallic phases, one or more silver-silicon intermetallic phases, one or more copper-silver-silicon intermetallic phases, one or more beryllium-silicon intermetallic phases, and/or one or more copper-beryllium-silicon intermetallic phases.

12. The anode of claim 8, wherein a minor portion of the silicon particles embedded within the copper matrix are surfacial silicon particles that partially define one or more surfaces of the anode, and wherein the surfacial silicon particles comprise silicon oxide.

13. A battery cell comprising:
an anode;
a cathode; and
an electrolyte in contact with the anode and the cathode, wherein the anode comprises silicon particles embedded within a copper matrix, and the anode comprises 40 at. % to 75 at. % total silicon,
wherein the anode comprises about 21 at. % to about 67 at. % silicon present as the embedded silicon particles and the balance of the total silicon in the anode is present as one or more metal-silicon intermetallic phases in the copper matrix,
wherein the copper matrix comprises copper, silicon, and at least one of gold, silver, beryllium, or zinc, and
wherein at least one of the one or more metal-silicon intermetallic phases in the copper matrix comprises gold, silver, beryllium, or zinc.

14. The battery cell of claim 13, wherein the copper matrix comprises elemental copper and one or more copper-silicon intermetallic phases, and wherein the one or more copper-silicon intermetallic phases comprise eta phase $Cu_3Si$, gamma phase $Cu_{56}Si_{11}$, and/or epsilon phase $Cu_{15}Si_4$.

15. The anode of claim 13, wherein the copper matrix further comprises nickel, and the copper matrix includes one or more copper phases, one or more nickel phases, one or more copper-nickel alloy phases, one or more copper-silicon intermetallic phases, one or more nickel-silicon intermetallic phases, and/or one or more copper-nickel-silicon intermetallic phases.

16. The anode of claim 13, wherein a non-silicon fraction of the copper matrix comprises copper and up to about 50 at. % zinc, and the copper matrix includes one or more copper phases, one or more zinc phases, one or more copper-zinc alloy phases, one or more copper-silicon intermetallic phases, one or more zinc-silicon intermetallic phases, and/or one or more copper-zinc-silicon intermetallic phases.

17. The battery cell of claim 13, wherein the silicon particles embedded in the copper matrix have an average particle diameter less than 10 μm.

18. An anode consisting of silicon particles embedded in a copper matrix, wherein the anode includes 60 at. % to 70 at. % total silicon, about 47 at. % to about 61 at. % of the total silicon is present as the silicon particles, and the balance of the total silicon in the anode is present as one or more metal-silicon intermetallic phases in the copper matrix,
wherein the silicon particles have an average particle diameter less than 10 μm,
wherein the copper matrix comprises copper, silicon, and at least one of gold, silver, beryllium, or zinc, and
wherein at least one of the one or more metal-silicon intermetallic phases in the copper matrix comprises gold, silver, beryllium, or zinc.

* * * * *